US010203778B2

(12) United States Patent
Westhues et al.

(10) Patent No.: US 10,203,778 B2
(45) Date of Patent: Feb. 12, 2019

(54) ACTIVE STYLUS MOTION VECTOR

(71) Applicant: Microsoft Technology Licensing, LLC, Redmond, WA (US)

(72) Inventors: Jonathan Westhues, Portland, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/602,623

(22) Filed: May 23, 2017

(65) Prior Publication Data
US 2018/0129312 A1 May 10, 2018

Related U.S. Application Data

(60) Provisional application No. 62/417,948, filed on Nov. 4, 2016.

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 3/0383* (2013.01); *G06F 3/044* (2013.01); *G06F 3/0412* (2013.01); *G06F 3/0416* (2013.01)

(58) Field of Classification Search
CPC .. G06F 3/03545; G06F 3/0383; G06F 3/0412; G06F 3/044
See application file for complete search history.

(56) References Cited

U.S. PATENT DOCUMENTS

| 4,638,118 A | 1/1987 | Wang et al. |
| 2010/0245286 A1 | 9/2010 | Parker |

(Continued)

FOREIGN PATENT DOCUMENTS

| EP | 2829953 A1 | 1/2015 |

OTHER PUBLICATIONS

"International Search Report and Written Opinion Issued in PCT Application No. PCT/US2017/058929", dated Feb. 15, 2018, 12 Pages.

(Continued)

*Primary Examiner* — Peter D McLoone
(74) *Attorney, Agent, or Firm* — Alleman Hall Creasman & Tuttle LLP

(57) ABSTRACT

Examples are disclosed herein that relate to capacitive touch sensor operation. An example provides a method for operating a display system having a capacitive touch sensor comprising operating the touch sensor over a plurality of successively repeating touch frames, with the touch sensor, determining a motion vector for an active stylus in relation to the touch sensor, and in each of the touch frames, for a stylus-interaction sub-frame of that touch frame allocated for performing electrostatic interaction between an active stylus and the touch sensor, selecting a portion of the touch sensor based on the motion vector. In each of the stylus-interaction sub-frames, the selected portion of the touch sensor may be operated differently than other portions of the touch sensor to carry out the electrostatic interaction.

20 Claims, 8 Drawing Sheets

(51) Int. Cl.
G06F 3/041 (2006.01)
G06F 3/044 (2006.01)

(56) References Cited

U.S. PATENT DOCUMENTS

| | | |
|---|---|---|
| 2013/0100071 A1 | 4/2013 | Wright et al. |
| 2013/0176270 A1 | 7/2013 | Cattivelli et al. |
| 2013/0176273 A1 | 7/2013 | Li et al. |
| 2014/0043251 A1 | 2/2014 | Wilson et al. |
| 2014/0077827 A1 | 3/2014 | Seguine |
| 2014/0098072 A1 | 4/2014 | Singh et al. |
| 2014/0198052 A1 | 7/2014 | Tokutake |
| 2015/0091869 A1 | 4/2015 | Sobel et al. |
| 2016/0224177 A1 | 8/2016 | Krah |
| 2016/0253033 A1 | 9/2016 | Omelchuk et al. |
| 2017/0192534 A1* | 7/2017 | Han .................... G06F 3/0383 |

OTHER PUBLICATIONS

"Touch Panel for Asymmetric Conductive Patterns, Related Device and Method Thereof", http://www.technology-x.net/G06F3/200910152336.html, Nov. 3, 2013, 3 pages.

Barrett, et al., "Projected Capacitive Touch Screens", In Publication of Information Display Magazine, vol. 26, No. 3, 2010, 9 pages.

* cited by examiner

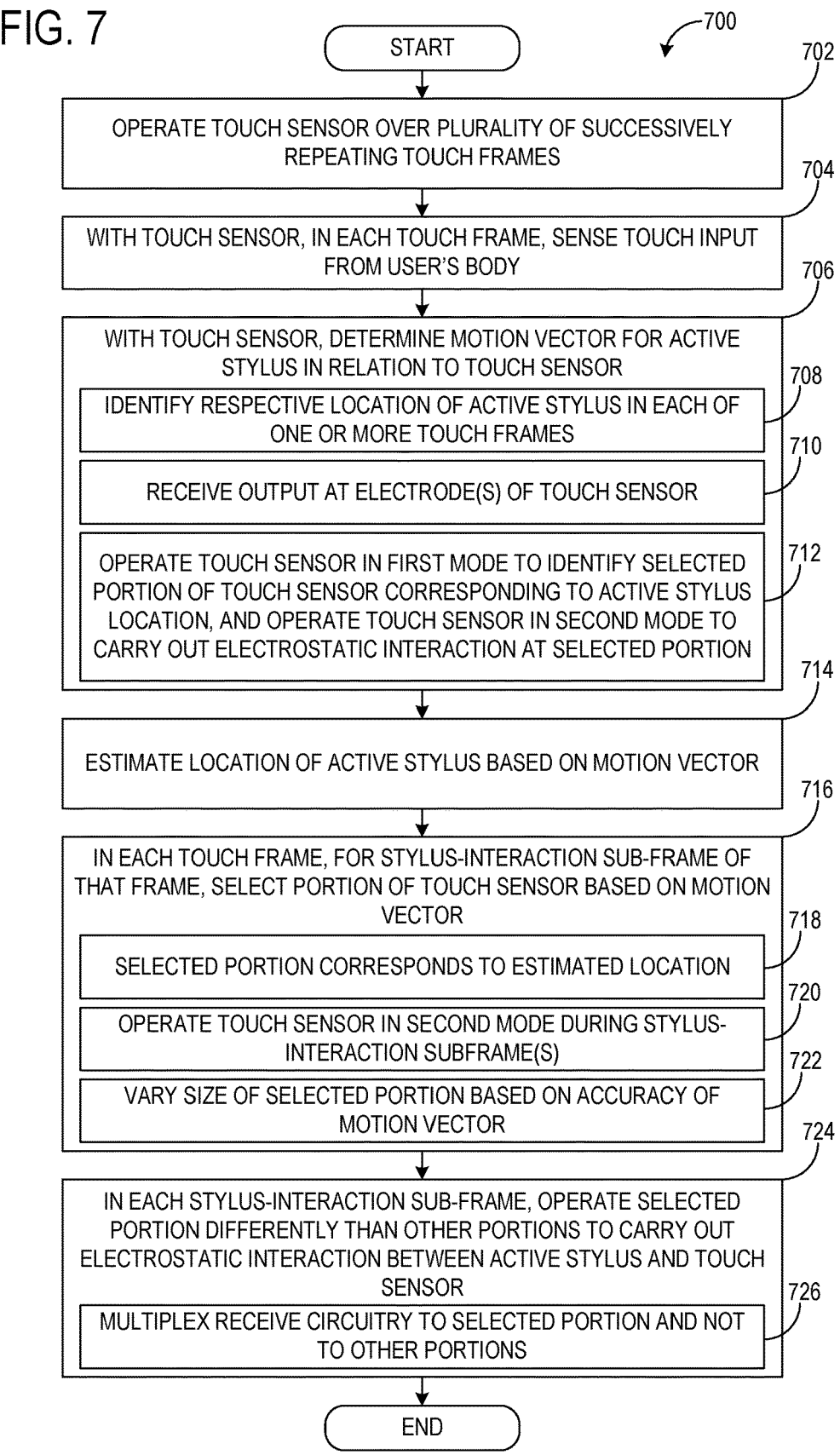

ACTIVE STYLUS MOTION VECTOR

CROSS REFERENCE TO RELATED APPLICATIONS

This application claims priority to U.S. Provisional Patent Application No. 62/417,948 filed Nov. 4, 2016, the entirety of which is hereby incorporated herein by reference.

BACKGROUND

Some touch sensors receive input from an external input mechanism, such as a stylus. To facilitate interaction with a stylus, a touch sensor may attempt to locate the stylus by scanning its sensing area for stylus proximity. For example, a capacitive touch sensor may scan a plurality of electrodes for capacitive influence from a proximate stylus.

BRIEF DESCRIPTION OF THE DRAWINGS

FIG. 7 shows a flowchart illustrating an example method for operating a display system having a capacitive touch sensor.

DETAILED DESCRIPTION

As described above, some touch sensors receive input from an external input mechanism, such as a stylus. To facilitate interaction with a stylus, a touch sensor may attempt to locate the stylus by scanning its sensing area for stylus proximity. For example, a capacitive touch sensor may scan a plurality of electrodes for capacitive influence from a proximate stylus.

System designs in many cases must navigate a tradeoff between stylus location accuracy and touch scanning frequency. A touch sensor may increase stylus location accuracy by spending more time in a touch frame on sensing stylus location. However, increased scanning durations can reduce update frequency and introduce latency in interactions between the stylus and the touch sensor. This may degrade the user experience by causing apparent delays between stylus inputs and resultant outputs—e.g., display of graphical content on a display device operatively coupled to the touch sensor. On the other hand, while desirable from a speed standpoint, reduced scan duration can diminish location accuracy.

Accordingly, implementations are disclosed herein for improving operations that depend on locating an active stylus over a capacitive touch sensor. One contemplated mechanism involves determination of a motion vector for the active stylus in relation to the touch sensor. A portion of the touch sensor may be selected based on the motion vector and operated differently than other portions of the touch sensor. In one example, the touch sensor may limit listening operations to an area where the motion vector predicts the stylus will be in the future. The listening operations may include listening for transmissions from the stylus.

In some implementations, successful interaction between an active stylus and a touch sensor depends not only receiving stylus transmissions at the touch sensor, but receiving stylus transmissions at the relevant portion of the touch sensor. As described in further detail below, a touch sensor may be configured such that only some portion, and not all, of its sensing area is available to receive stylus transmissions at any given time. As such, listening for stylus transmissions in the correct portion—e.g., the portion to which the stylus is most proximate—may be imperative. To this end, examples are described herein that enable the touch sensor to determine a motion vector of the stylus to predict the future location of the stylus. With the predicted future location, the touch sensor may configure operation (e.g., preemptively) to listen for stylus transmissions in the predicted location. Relative to an instant measurement of stylus location, the motion vector may enhance stylus locating accuracy and listening operations by accounting for stylus motion not captured by the instant measurement.

Figure 1:
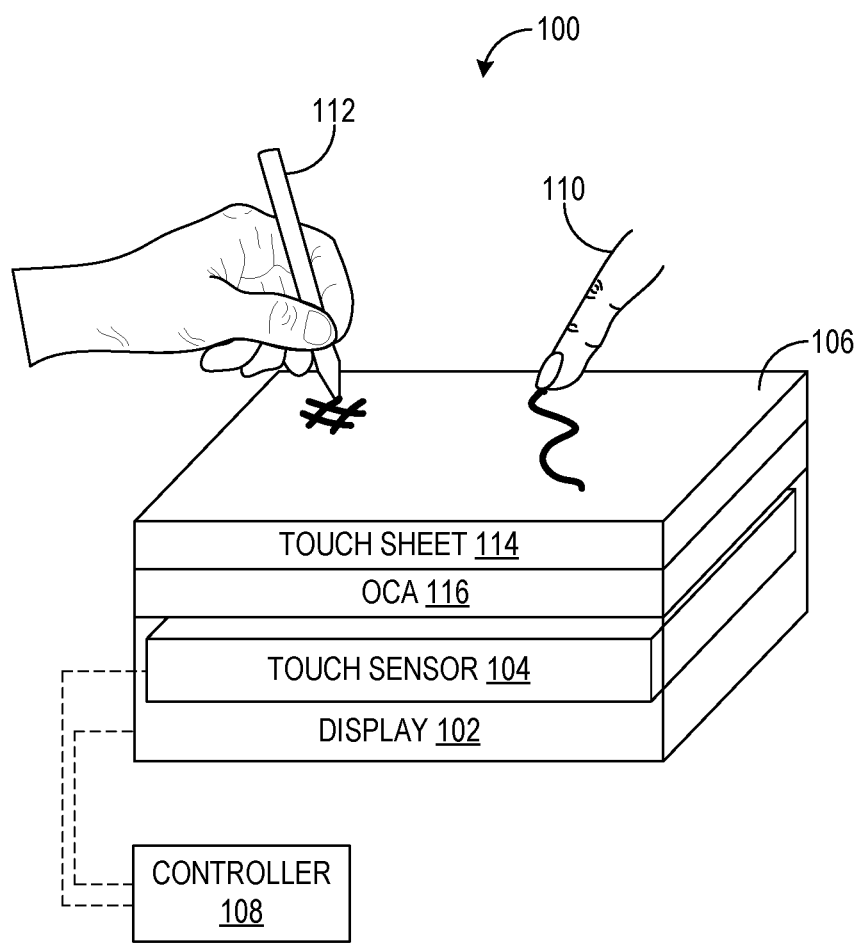
FIG. 1 shows an example display system.

FIG. 1 shows an example display system 100 that may operate based on a stylus motion vector. Display system 100 includes a display 102 and a capacitive touch sensor 104 to enable graphical output and input sensing. Display 102 may selectively emit light in an upward direction to yield viewable imagery at a top surface 106 of the display device or other locations. Display 102 may assume the form of a liquid crystal display (LCD), organic light-emitting diode display (OLED), or any other suitable display.

Touch sensor 104 may receive input in a variety of form(s). As examples, touch sensor 104 and associated componentry may sense touch input from a user's body, such as input applied by a human digit 110 in contact with top surface 106 of display system 100, and/or input from a non-digit input device such as an active stylus 112. As described in further detail below, touch sensor 104 may (1) receive position, tip force/pressure, button state, and/or other stylus state information from stylus 112; (2) transmit information to the stylus; and/or (3) perform selective operation based on a determined motion vector of the stylus. Other forms of input received at touch sensor 104 may include force/pressure, hover input, and/or the height associated with a hovering input mechanism, for example. Further, touch sensor 104 may receive input from multiple input devices (e.g., digits, styluses, other input devices) simultaneously, in which case display system 100 may be referred to as a "multi-touch" display system. To enable input reception, touch sensor 104 may detect changes associated with the capacitance of a plurality of electrodes, as described in further detail below.

Inputs received by touch sensor 104 may affect any suitable aspect of display 102 and/or a computing device operatively coupled to display system 100, and may include two or three-dimensional finger inputs and/or gestures. As an example, FIG. 1 depicts the output of graphical content by display 102 in spatial correspondence with paths traced out by digit 110 and stylus 112 proximate to top surface 106.

A controller 108, coupled to display 102 and touch sensor 104, may effect display operation (e.g., pixel output, drive electronics) and touch sensor operation (e.g., electrode driving and receiving). A suitable image source, which may be integrated with, or provided separately from, controller 108, may provide graphical content for output by display 102. The image source may be a computing device external to, or integrated within, display system 100, for example. While FIG. 1 shows controller 108 as effecting operation of both display 102 and touch sensor 104, separate display and touch sensor controllers may be provided.

Display system 100 may be implemented in a variety of forms. For example, display system 100 may be implemented as a so-called "large-format" display device with a diagonal dimension of approximately 1 meter or greater, or in a mobile device (e.g., tablet, smartphone) with a diagonal dimension on the order of inches. Other suitable forms are contemplated, including but not limited to desktop display monitors, high-definition television screens, tablet devices, etc.

Display system 100 may include other components in addition to display 102 and touch sensor 104. As an example, FIG. 1 shows an optically clear touch sheet 114 providing top surface 106 for receiving touch input as described above. Touch sheet 114 may comprise any suitable materials, such as glass or plastic. Further, an optically clear adhesive (OCA) 116 bonds a bottom surface of touch sheet 114 to a top surface of display 102. As used herein, "optically clear adhesive" refers to a class of adhesives that transmit substantially all (e.g., about 99%) of incident visible light. Display system 100 may include alternative or additional components not shown in FIG. 1, including but not limited to various optical elements (e.g., lens, diffuser, diffractive optical element, waveguide, filter, polarizer).

FIG. 1 depicts the integration of touch sensor 104 within display 102 in a so-called "in-cell" touch sensor implementation. In this example, one or more components of display system 100 may be operated to perform both display output and input sensing functions. As a particular example in which display 102 is an LCD, the same physical electrode structures may be used both for capacitive sensing and for determining the field in the liquid crystal material that rotates polarization to form a displayed image. Alternative or additional components of display system 100 may be employed for display and input sensing functions, however. Further details regarding in-cell implementations are described below with reference to FIG. 3, which shows an example in-cell touch sensor.

Other touch sensor configurations are possible. For example, touch sensor 104 may alternatively be implemented in a so-called "on-cell" configuration, in which the touch sensor is disposed directly on display 102. In an example on-cell configuration, touch sensing electrodes may be arranged on a color filter substrate of display 102. Implementations in which touch sensor 104 is configured neither as an in-cell nor on-cell sensor are possible, however. In such implementations, an optically clear adhesive (OCA) may be interposed between display 102 and touch sensor 104, for example. Further details regarding discrete touch sensor implementations are described below with reference to FIG. 2, which shows an example row/column touch sensor.

Figure 2:
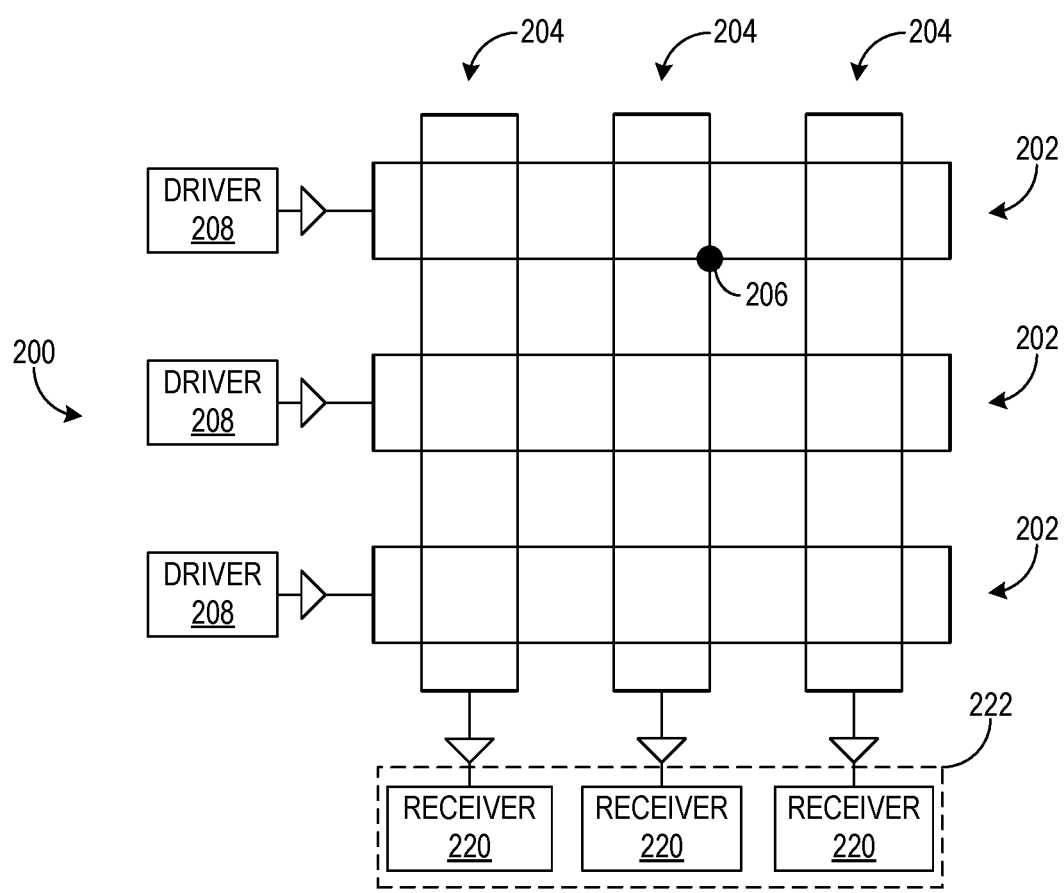
FIG. 2 shows an example touch sensor.

FIG. 2 shows an example capacitive touch sensor 200 that may perform selective operation based on an active stylus motion vector. Touch sensor 200 includes a plurality of electrodes in the form of transmit rows 202 vertically spaced from receive columns 204. Each vertical intersection of transmit rows 202 with receive columns 204 forms a corresponding node such as node 206 whose electrical properties (e.g., capacitance) may be measured to detect touch and/or other inputs. Touch sensor 200 thus represents a mutual capacitance approach to touch sensing, in which a relative electrical property between electrodes is analyzed. While three transmit rows 202 and three receive columns 204 are shown in FIG. 2 for simplicity, touch sensor 200 may include any suitable number of transmit rows and receive columns, which may be on the order of one hundred or one thousand, for example.

Each transmit row 202 is coupled to a respective driver 208 configured to drive the corresponding transmit row with an excitation sequence. An excitation sequence may take the form of a time-varying voltage that, when digitally sampled, includes a sequence of pulses. The sequence of pulses may include binary values (e.g., 0 or 1, 1 or −1), or three or more values in other implementations. When applied to a transmit row 202, the excitation sequence may induce currents at one or more receive columns 204 in locations corresponding to the nodes between the transmit rows and receive columns. As the currents may be proportional to the capacitance of their corresponding nodes, measurement of the currents may enable measurement of their corresponding capacitances. Currents induced on a receive column—and on other electrodes configured to receive induced current described herein—may be analyzed to assess node capacitance and thereby detect touch input, and/or perform other potential operations. To this end, each receive column 204 is coupled to a respective receiver 220. The set of receivers 220 in touch sensor 200 is collectively designated receive logic 222.

Each receiver 220 includes circuitry for sampling current induced at receive columns 204 and analyzing the current in a correlation-based approach to input sensing. To this end, each receiver 200 may include an analog-to-digital converter (ADC) for sampling current, and correlation circuitry for correlating (e.g., via the cross-correlation function) sampled current with a reference sequence, yielding an output reflective of the current. The output may be a number that is compared to a threshold to determine whether an input mechanism is proximate to touch sensor 200, for example. In some examples, a drive signal used to drive electrodes may form the basis for a reference sequence. Further, one or more reference sequences may be designed to mitigate noise for certain operating conditions, noise sources, and/or wavelength bands.

In some implementations, the driving of transmit rows 202 described above may occur in a time-sequential manner. For example, each transmit row 202 in touch sensor 200 may be successively driven, with resultant currents being received at one or more receive columns 204 for each driven transmit row. Receive columns 204 may be held at a constant voltage (e.g., ground) while the currents are received. A complete scan of all transmit rows 202 may be referred to herein as a "touch frame", though in other examples a touch frame may refer to driving a subset of the transmit rows and/or receiving at a subset of receive columns 204, or to multiple scans of a given set of rows/columns. Additional detail regarding touch frames is described below with reference to FIGS. 5-6E.

As described above, touch sensor 200 may selectively control touch sensing operation based on a motion vector of an active stylus. The motion vector may be computed based on multiple locations of the stylus in one or more touch frames, and may suggest a region of touch sensor 200 where the stylus is likely to be in a future touch frame. As such, touch sensor 200 may control operation according to the region suggested by the motion vector in the future frame. For example, touch sensor 200 may employ a first "full search" mode of operation in which the entire set of transmit rows 202 and receive columns 204 is scanned to locate the stylus, among other potential inputs. The first mode may be repeated for two or more touch frames, and/or for multiple portions of a touch frame, to determine respective stylus locations in those frames/portions that may be used to determine the motion vector.

Touch sensor 200 may employ a second "local search" mode of operation in which a portion of the touch sensor corresponding to the future stylus location suggested by the motion vector is operated differently from the other portions of the touch sensor. In particular, touch sensor 200 may localize scanning of receive columns 204 to the receive columns in the area of the suggested location. Receive electrodes 204 not in the area of the suggested location may be omitted from scanning in the second mode, which may reduce processing time and power consumption, and increase scanning frequency and lower stylus interaction latency. As described in further detail below, touch sensor 200 may listen for stylus transmissions relating to stylus state during local searches. As such, knowledge of current and future stylus locations may be desired so that touch sensor 200 is properly configured to receive stylus transmissions.

It will be understood that touch sensor 200 is provided as an example and may assume other forms and modes of operation. For example, while a rectangular grid arrangement is shown in FIG. 2, the electrodes may assume other geometric arrangements (e.g., a diamond pattern, mesh). Alternatively or additionally, the electrodes may assume nonlinear geometries—e.g., curved or zigzag geometries, which may minimize the perceptibility of display artifacts (e.g., aliasing, moiré patterns) caused by occlusion of an underlying display by the electrodes. Further, while touch sensor 200 is described herein as including electrodes oriented as horizontal transmit rows 202 and vertical receive columns 204, any suitable orientation may apply. For example, electrode rows instead may be oriented vertically (e.g., as transmit columns), with electrode columns being oriented horizontally (e.g., as receive rows). Other orientations, including non-rectilinear orientations, are also possible. As another example, one or more electrodes (e.g., rows, columns) may be oriented at oblique angles relative to horizontal and/or vertical axes.

Figure 3:
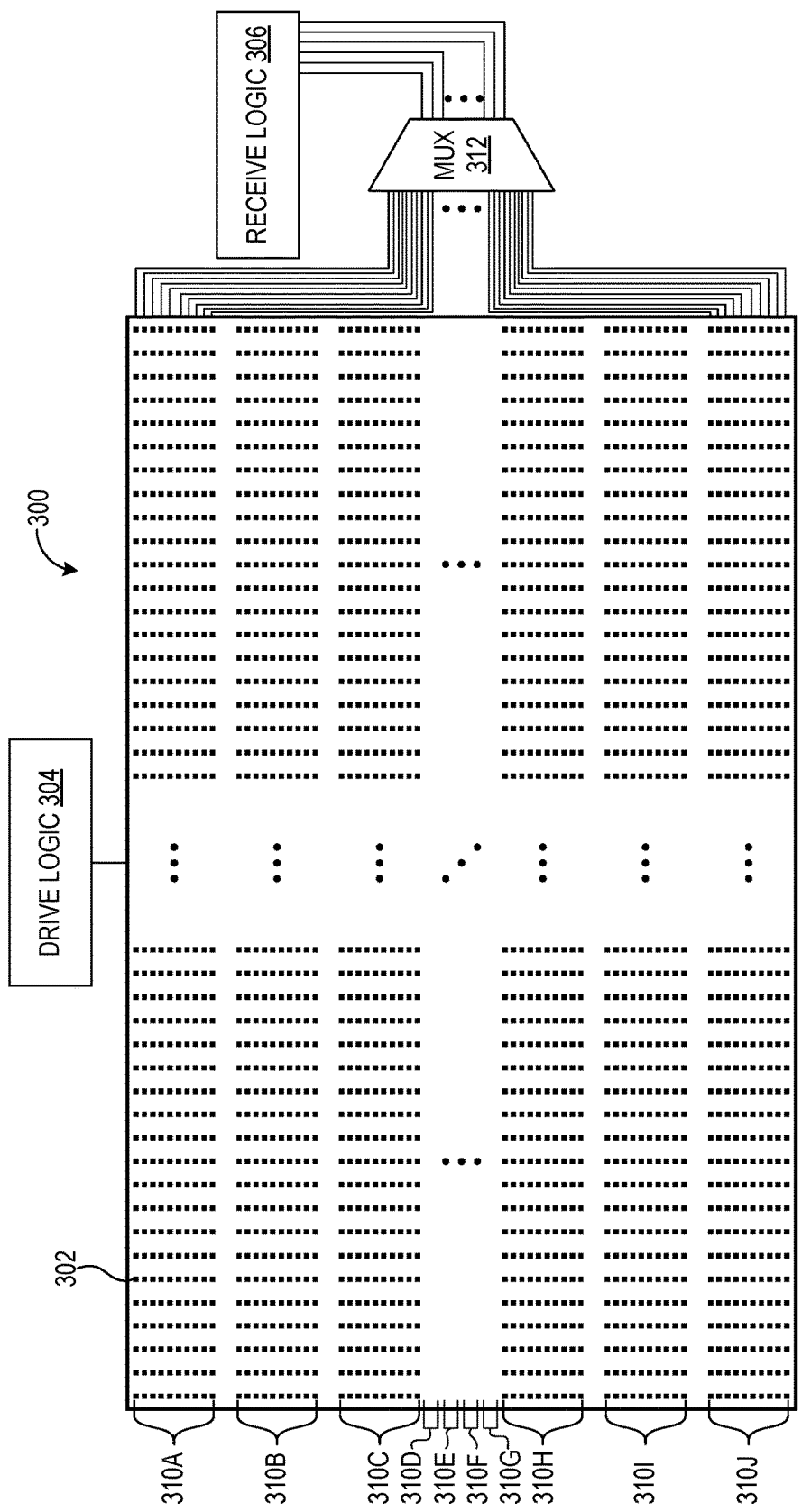
FIG. 3 shows an example in-cell touch sensor.

FIG. 3 shows an example in-cell touch sensor 300 that may perform selective operation based on an active stylus motion vector. Touch sensor 300 includes a plurality of electrodes (e.g., electrode 302), each of which are configured to detect touch and/or other inputs by receiving current. The plurality of electrodes is referred to herein as a plurality of "sensels", for example with reference to in-cell and on-cell implementations. To enable sensel charging and the reception of resulting output, the sensels are operatively coupled to drive logic 304 and receive logic 306. Via drive logic 304, each sensel may be selectively driven with an excitation sequence, and, via receive logic 306, charge induced by such driving and other conditions (e.g., finger inputs) is analyzed to perform input sensing. Touch sensor 300 thus represents a self-capacitance approach to touch sensing, in which the electrical properties of a sensel itself are measured, rather in relation to another electrode in the touch sensor.

Due to the relatively large number of sensels included in a typical implementation of touch sensor 300, a limited number of sensels are shown in FIG. 3 for simplicity/clarity. Examples described below contemplate a particular configuration in which touch sensor 300 includes 20,000 sensels—e.g., when implemented in a large-format display device. Touch sensor 300 may include any suitable number of sensels, however.

In an example such as that referenced above with 20,000 sensels, the sensels may be arranged in 100 rows and 200 columns. While it may be desirable to maximize sensing frequency by simultaneously measuring capacitance at each sensel, this would entail provision of significant processing and hardware resources. In particular, 20,000 receivers in receive logic 306 would be needed to perform full-granularity, simultaneous self-capacitance measurements at each sensel. As such, partial-granularity, multiplexed approaches to self-capacitance measurement may be desired to reduce the volume of receive logic 306. Specifically, as described below, receive logic capable of servicing only a portion of the touch sensor at one time may be successively connected to different portions of the touch sensor over the course of a touch frame, via time multiplexing, in order to service the entirety of touch sensor 300.

FIG. 3 illustrates one example approach to partial-granularity self-capacitance measurement in touch sensor 300. In this approach, the sensels are grouped into horizontal bands 310A-310J, each having ten rows of sensels. Self-capacitance measurements are temporally multiplexed via a multiplexer 312, with a respective measurement time slot in a touch frame being allocated for each band 310. Accordingly, receive logic 306 may include a number of receivers equal to the number of sensels in a given band 310—e.g., 2,000 receivers. For example, the receivers may be connected to one band in a first time slot, then to another in the next time slot, and so on. It will be appreciated that the above groupings, bands, number of sensels, etc. reflect but one of many possible implementations. Different numbers of sensels may be employed; shapes and arrangements of groupings may differ from the depicted example; etc. Further, similar multiplexing may be applied in driving the plurality of sensels, such that the sensels are arranged in subsets which are each driven in a corresponding time slot of a touch frame.

Touch sensor 300 may employ a variety of operating modes to effect sensel operation. In one mode, all sensels may be driven to perform input sensing, which may simplify drive logic 304. Further, drive logic 304 may apply a single excitation sequence during an operating mode, differing excitation sequences during the mode, or may employ multiple modes with differing excitation sequences.

As described above, touch sensor 300 may selectively control touch sensing operation based on a motion vector of an active stylus. To determine the motion vector, touch sensor 300 may employ a first "full search" mode. The full search mode may be repeated for two or more touch frames, and/or for multiple portions of a touch frame, to determine respective locations of the active stylus in those frames/portions, which may be used to determine the motion vector. In one example, touch sensor 300 allocates, in a touch frame, a time slot for full searching in each band 310. While touch sensor 300 may drive all sensels during a full search time slot, output may be sensed in a single band 310 during the time slot via multiplexing of that band to receive logic 306, as described above. Thus, touch sensor 300 may conduct full searches for each band 310 in a touch frame to sense input across the entire sensor.

With a motion vector determined via full searching, touch sensor 300 may employ a second "local search" mode in which a portion of the touch sensor, corresponding to the future stylus location suggested by the motion vector, is operated differently from the other portions of the touch sensor. For example, touch sensor 300 may multiplex a particular band 310 suggested by the motion vector to receive logic 306 to perform input sensing in that band. The local search in the particular band 310 may thus omit other bands, which may increase scanning frequency and reduce stylus interaction latency. In other examples, however, a stylus motion vector may suggest two or more bands 310 as future stylus locations, which may prompt local searching in those bands. As described in further detail below, touch sensor 300 may listen for stylus transmissions relating to stylus state during local searches. As such, knowledge of current and future stylus locations may be desired so that touch sensor 300 is properly configured to receive stylus transmissions.

While described above as an in-cell or on-cell touch sensor, implementations are contemplated in which touch sensor 300 is configured as neither an on-cell touch sensor nor an in-cell touch sensor. For example, touch sensor 300 may be provided as a discrete touch sensor separated from display 102 by an interposed element in display system 100.

Figure 4:
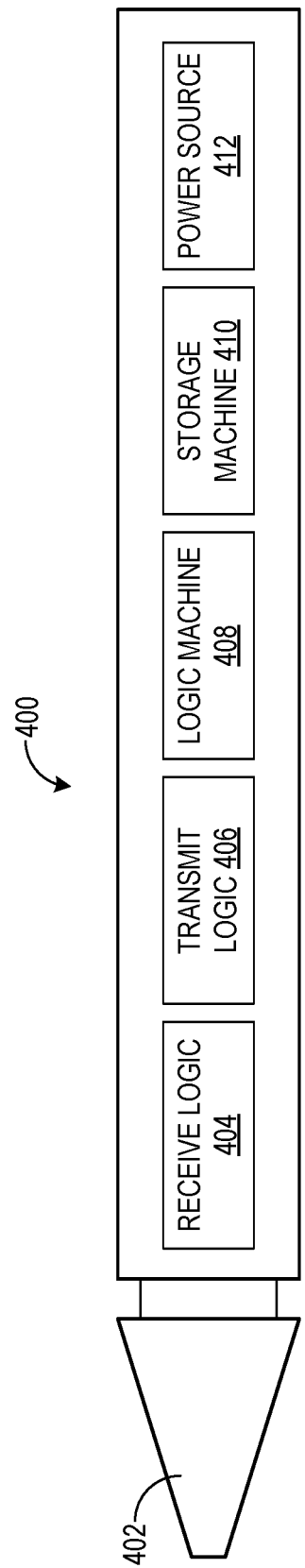
FIG. 4 shows an example active stylus.

Turning now to FIG. 4, an example active stylus 400 is shown for which touch sensor 200 and/or 300 may determine a motion vector. Stylus 400 includes an electrode tip 402 through which capacitive signals may be transmitted and/or received, for example in the form of electrostatic fields. Capacitive signals received through electrode tip 402 may be routed to receive logic 404, which may correlate the capacitive signals with a reference sequence to receive touch sensor communications, assess noise conditions, and/or perform other operations.

Stylus 400 further includes transmit logic 406 for transmitting capacitive signals. In particular, transmit logic 406 may cause the application of an excitation sequence to electrode tip 402, which may induce a capacitive signal at a proximate touch sensor. During some operating periods, stylus 400 may transmit an excitation sequence in the form of a locating signal designed to enable the touch sensor to determine the location of the stylus. In some examples, the locating signal may induce output at the touch sensor similar to output induced by finger touches but opposite in polarity (e.g., to simplify the drive/receive scheme). Further, the periods in which the locating signal is transmitted may correspond to touch sensor operation in the first full search mode described above.

Stylus 400 may transmit data regarding stylus state information during periods in which the touch sensor operates in the local search mode described above. The stylus state information may include data regarding a stylus identifier, battery level, firmware version, force/pressure at electrode tip 402, button state, and/or other data. In one example, the touch sensor first locates stylus 400 using all electrodes, and then listens for transmissions from the stylus using a relatively smaller subset of electrodes generally localized to the determined stylus location. As described in further detail below, the touch sensor may transmit a synchronization beacon prior to full and local searches in a touch frame so that stylus 400 gains knowledge of the timing of the touch frame and when to transmit locating sequences and stylus state information.

In some examples, stylus 400 may attempt to determine its location relative to a touch sensor. When operated in a mode in which a common excitation sequence is applied to the entirety of the touch sensor, however, the touch sensor may appear the same across its surface, rendering the stylus unable to determine its relative location. Accordingly, the touch sensor (e.g., touch sensor 200 and/or 300) may apply two or more different excitation sequences to its electrodes. As a particular example with reference to touch sensor 300, a respective excitation sequence may be applied to each band 310. This may allow stylus 400 to determine the particular band 310 to which it is proximate, to which it may transmit a locating sequence to touch sensor 300. Stylus 400 may receive additional information with which to further refine its relative location.

Stylus 400 further includes a logic machine 408 that executes instructions held by a storage machine 410 to effect the approaches described herein. A power source 412, such as a battery, provides power to the components of stylus 400. Stylus 400 may include alternative or additional components not shown in FIG. 4, including but not limited to one or more buttons, an electrode end, one or more electrodes arranged in the stylus body, and a force sensor for determining force/pressure associated with deflection of electrode tip 402.

Figure 5:
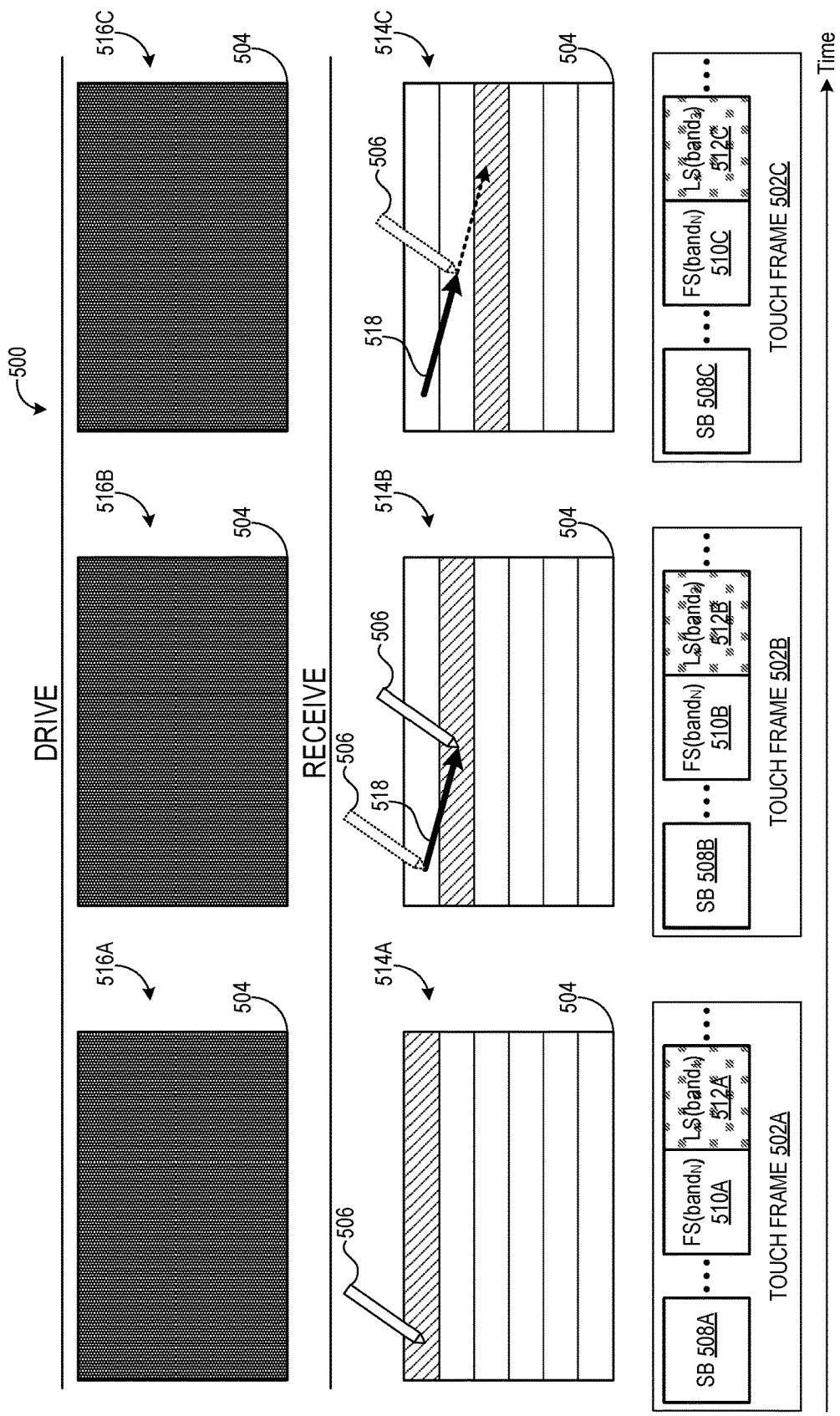
FIG. 5 shows an example touch frame sequence.

To illustrate the selective operation of a touch sensor based on a motion vector of an active stylus, FIG. 5 shows an example touch frame sequence 500. Sequence 500 includes three successive touch frames 502A-C, each of which are shown in correspondence with the interactive state of a touch sensor 504 with an active stylus 506. For simplicity, touch sensor 504 is shown with six horizontal sensel bands that are each multiplexed to receive circuitry during a respective time slot of a touch frame. However, the approaches described herein may be adapted to a touch sensor with any suitable number of horizontal sensel bands (e.g., ten bands as in touch sensor 300), or to other electrode groupings (e.g., vertical, rectilinear, non-rectilinear, irregular, non-Euclidean). As such, the approaches described herein may also be adapted to non-sensel-based touch sensors such as row/column touch sensor 200.

Touch frame sequence 500 includes a first touch frame 502A, which begins with the transmission of a synchronization beacon 508A from touch sensor 504 to active stylus 506. As described above, synchronization beacon 508A enables stylus 506 to gain knowledge regarding the timing of touch frame 502A. Following transmission of synchronization beacon 508A, touch sensor 504 conducts a full search 510A in the first band of the touch sensor, revealing the proximity of stylus 506 to the first band. Full search 510A thus prompts a local search 512A in the first band where the presence of stylus 506 was initially revealed, as indicated at 514A. Stylus 506 may transmit state information as described above during local search 512A, whose timing is known via reception of synchronization beacon 508A. As indicated at 516A, the plurality of sensels of touch sensor 504 is driven during local search 512A, and potentially during full search 510A and/or transmission of synchronization beacon 508A.

Full search 510A, and local search 512A, may occur at any suitable time in touch frame 502A. For example, full search 510A may be the first of multiple full searches within touch frame 502A, and may be conducted at the first band of touch sensor 504. Touch frame 502A may include subsequent full searches, for example five additional full searches respectively conducted in bands 2-6 of touch sensor 504. Should any of the additional full searches reveal the presence of an input mechanism, a subsequent local search may follow in the corresponding band.

Figure 6A:
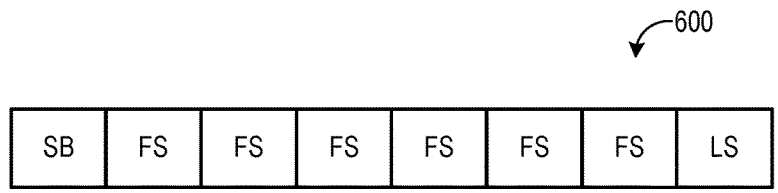
FIGS. 6A-6E show example respective touch frames.
Figure 6B:
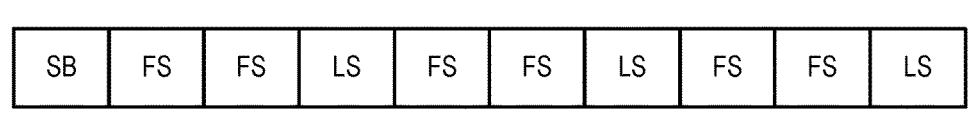
Figure 6C:
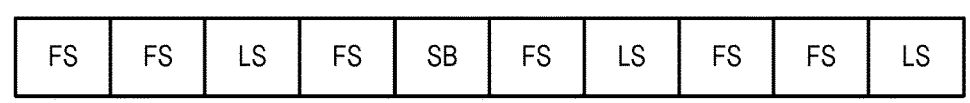

Other touch frame structures are contemplated according to which the touch sensors described herein may operate. With brief reference to FIGS. 6A-E, FIG. 6A shows an example touch frame 600 in which full searches are successively conducted in each and every band of touch sensor 504 before performing local searching. Results from all full searches in touch frame 600—i.e., results from scanning the entirety of touch sensor 504—are considered before identifying a band in which to perform local searching. In this example, full search 510A of first touch frame 502A may be the sixth and final search conducted in the last band of touch sensor 504, with results from five preceding full searches in bands 1-5 being considered before performing local search 512A in the first band. Thus, full search 510A in some examples may not be the particular full search that identifies the first band corresponding to stylus 506. FIG. 6B shows another example touch frame 602 in which two successive full searches (e.g., in successive bands) are interleaved with local searches in a single band. FIG. 6C shows yet another example touch frame 604 in which a synchronization beacon is transmitted after performing at least one search, instead of at the beginning of the touch frame.

Figure 6D:
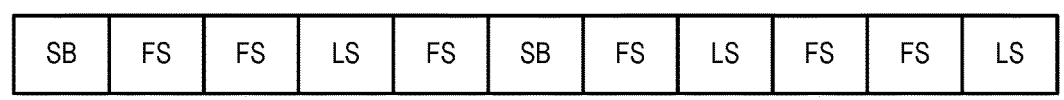
Figure 6E:
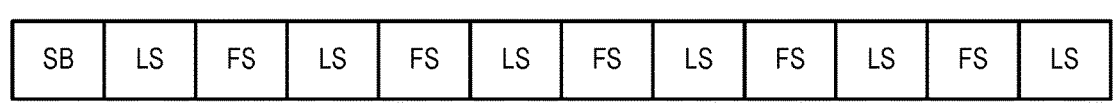

FIG. 6D shows still another example touch frame 606 illustrating the transmission of two or more synchronization beacons within a single touch frame. The synchronization beacon may be retransmitted within a single touch frame based on a determination of the instant noise conditions—e.g., that noise in signals received by a stylus is likely to exceed a noise threshold. FIG. 6E shows a fifth example touch frame 608 in which the first search is a local search in a particular band of touch sensor 504. As described in further detail below, a motion vector of stylus 506 determined in a preceding touch frame may predict its future presence in the particular band during touch frame 608. As such, touch sensor 504 may begin sensing in touch frame 608 in the predicted band, as a likely wager that stylus 506 will be found there.

Returning to FIG. 5, touch frame sequence 500 further includes a second touch frame 502B. Touch frame 502B begins with a synchronization beacon 508B, which is followed by a full search 510B and a local search 512B in the second band of touch sensor 504, to which stylus 506 is now proximate, as indicated at 514B. Full search 510B or one or more other full searches in touch frame 502B may prompt local search 512B in the second band. As indicated at 516B, the plurality of sensels of touch sensor 504 is driven during full search 510B and/or local search 512B.

FIG. 5 illustrates an approach in which touch sensor 504 is operated in first and second modes. In the first mode—e.g., the performance of full searches 510—touch sensor 504 identifies a sensor portion (e.g., band) that corresponds to the location of stylus 506. The touch sensor engages the second mode—e.g., the performance of local searches 512—based on the identified portion to carry out electrostatic interaction with stylus 506 at the identified portion, and not at other portions of the touch sensor. Thus, touch frame portions in which local searching is conducted are referred to herein as "stylus-interaction sub-frames." As described above, the first mode may reveal an x/y location of stylus 506 relative to touch sensor 504, such that a portion of the touch sensor corresponding to the x/y location is selected and operated to receive stylus state information at the selected portion, such as identification information, battery level, button state information, etc.

With two locations of stylus 506 respectively identified in first and second touch frames 502A and 502B, touch sensor 504 determines a motion vector 518 of the stylus based on the identified locations. Motion vector 518 represents motion of stylus 506 between first and second touch frames 502A and 502B, and may be used to extrapolate future stylus locations/kinematic variables as described below. "Motion vector" as used herein may refer to a typical vector known in the art of mathematics, and may include a respective element or magnitude for one or more basis vectors or axes (e.g., Cartesian x and y). In other implementations described below, "motion vector" as used herein may refer to one or more kinematic variables (e.g., position/coordinate, speed/velocity, acceleration) of a stylus determined by a touch sensor.

Motion vector determination may consider any suitable number of touch frames. For example, five, ten, twenty, etc. touch frames—whether successive or separated by other touch frames—may be considered in a history of stylus motion. As another example, touch sensor 504 may determine a motion vector based on two or more stylus locations identified in a single touch frame—e.g., two or more locations determined via respective full searches in the single touch frame. Heuristic knowledge may be considered in selecting a number of touch frames with which to determine stylus motion vectors. For example, kinematic properties of stylus 506 (and human handling of the stylus) may render its movement negligible within a single touch frame for some configurations of touch sensor 504, making the use of multiple touch frames desirable in determining motion vectors.

Any suitable methods may be used to determine motion vector 518 and extrapolate kinematic variables using the motion vector. In one example, extrapolation may consider stylus coordinates determined in different frames. With continued reference to FIG. 5, touch sensor 504 may determine x and y-coordinates $x(n-1)$, $y(n-1)$ of stylus 506 in first touch frame 502A, and x and y-coordinates coordinates $x(n)$, $y(n)$ of the stylus in second touch frame 502B. The variable n refers to a sample or determination made at a first time (e.g., during second touch frame 502B), whereas n−1 refers to a sample or determination made at another time prior to the first time (e.g., during first touch frame 502A). The time difference between these two coordinate pairs may then be calculated as (e.g., the absolute value of) the difference between the time at which the second band of touch sensor 504 is scanned in second touch frame 502B and the time at which the first band is scanned in first touch frame 502A. Then, the speed of stylus 506 in the x-direction can be estimated as $v_x(n)=(x(n)-x(n-1))/dt$, and in the y-direction as $v_y(n)=(y(n)-y(n-1))/dt$. As stylus kinematic variables predicted with the estimated x and y speeds of stylus 506 may include noise (e.g., at least in part due to noise in capacitive measurements made by touch sensor 504), and/or because the stylus speed may change slowly, the touch sensor may extrapolate variables using smoothing. For example, x and y speeds $v_{s,x}(n)$, $v_{s,y}(n)$ of stylus 506 may be estimated as smoothed speeds respectively relative to non-smoothed x and y speeds $v_x(n)$, $v_y(n)$, and to smoothed prior x and y speeds $v_{s,x}(n-1)$, $v_{s,y}(n-1)$, as $v_{s,x}(n)=\alpha_x*v_x(n)+(1-\alpha_x)*v_{s,x}(n-1)$, and as $v_{s,y}(n)=\alpha_y*v_y(n)+(1-\alpha_y)*v_{s,y}(n-1)$, where $\alpha_x$ and $\alpha_y$ may be functions of the estimated stylus acceleration in the x and y-directions, respectively.

In another example of extrapolating kinematic variables of stylus 506, touch sensor 504 may employ a Kalman filter. For example, touch sensor 504 may define the state vector $s=(x, y, vx, vy)'$, where x and y represent the x and y-coordinates of stylus 506, respectively, and vx and vy represent the x and y speed of the stylus, respectively (e.g., determined as described above). Touch sensor 504 may further define a covariance matrix $P(n)$ (e.g., a 4×4 matrix in this example), which measures the uncertainty of the stylus state estimation at time/frame n. Then, the current position and speed of stylus 506 may be predicted in a prediction step based on the previous estimation as $s'(n)=F*s(n-1)$, where F is a 4×4 matrix with the elements of row 1 being (1, 0, dt, 0), the elements of row 2 being (0, 1, 0, dt), the elements of row 3 being (0, 0, 1, 0), and the elements of row 4 being (0, 0, 0, 1). dt may be the time difference between samples/determinations made at n and n−1 (e.g., between successive touch frames). The covariance matrix $P'(n)$ can be determined relative to a prior covariance matrix $P(n-1)$ as $P'(n)=F*P(n-1)*FT$. FT is the transpose of matrix F. Then, in a measurement step, touch sensor 504 may estimate the state of stylus 506 at time/frame n in the form of a state vector $z(n)=(xm(n), ym(n), 0, 0)'$, where $(xm(n), ym(n))$ is the stylus position estimated via capacitive sensing at the touch sensor. Touch sensor 504 can refine the stylus state estimation as $s(n)=s'(n)+K(z(n)-Hs'(n))$, and refine the covariance matrix as $P(n)=P'(n)-K*H*P'(n)$. H is a 4×4 matrix with the elements of row 1 being (1, 0, 0, 0), the elements of row 2 being (0, 1, 0, 0), the elements of row 3 being (0, 0, 0, 0), and the elements of row 4 being (0, 0, 0, 0). K is the Kalman filter gain, where $K=P'(n)*HT*(H*P'(n)*HT+R(n))-1$, where R(n) is the covariance matrix of the estimated state vector z(n)—e.g., the uncertainty of the estimation z(n)—which may be estimated based on capacitive sensing at touch sensor 504. For example, greater capacitive output may lead to greater SNR, and thus lower uncertainty.

Touch sensor 504 may use motion vector 518 to estimate the location of stylus 506 in a future touch frame subsequent to second touch frame 502B using the techniques described above (e.g., based on one or more of the above kinematic variables), and/or other suitable methods. In the example depicted in FIG. 5, touch sensor 504 estimates that stylus 506 will occupy a location corresponding to the third band in a third touch frame 502C (e.g., by extrapolating motion vector 518). Based on the location estimated via motion vector 518, touch sensor 504 selects a touch sensor portion—the third band corresponding to the estimated location—with which to operate differently from the other portions (bands) of the touch sensor. In particular, a local search 512C is conducted in the third band in third touch frame 502C for carrying out electrostatic interaction with stylus 506 to receive stylus state information, as indicated at 514C. Local search 512C may be preceded by a full search 510C in the same or other band (e.g., the first band) as shown in FIG. 5, or in other examples may be the first search performed in touch frame 502C, as in touch frame 608 described above. As indicated at 516C, the plurality of sensels of touch sensor 504 is driven during local search 512C, and potentially during full search 510C and/or transmission of a synchronization beacon 508C.

Use of a motion vector to estimate stylus location in the same touch frame in which the vector is determined is also contemplated. Specifically, two or more stylus locations determined by respective full searches in a touch frame—or in two or more touch frames—may lead to the determination of a motion vector. Based on the motion vector, a future location where stylus 506 is likely to be during a future stylus-interaction sub-frame, subsequent to the final full search used to determine the motion vector, can be estimated. Touch sensor 504 may then select a touch sensor portion corresponding to the estimated location with which to perform electrostatic interaction with stylus 506 during the stylus-interaction sub-frame. As described above, touch sensor 504 may employ the second mode of operation—e.g., local searching—during the stylus-interaction sub-frames.

Touch sensor 504 may consider the accuracy of motion vector 518 in selecting touch sensor portions for performing electrostatic interaction with stylus 506. In particular, touch sensor 504 may vary the size of a selected portion based on the accuracy of motion vector 518, such that, for a greater accuracy of the motion vector, the selected portion is identified as having a lesser size, and, for a lesser accuracy of the motion vector, the selected portion is identified as having a greater size. For example, for a greater accuracy of the motion vector (e.g., above a threshold accuracy), touch sensor 504 may select a single band for local searching. For a lesser accuracy of the motion vector (e.g., below the threshold accuracy), touch sensor 504 may select two or more bands for local searching—e.g., a band in which stylus 506 proximity is most strongly suspected and one adjacent band, or the band in which the stylus proximity is most strongly suspected plus two adjacent bands above and below. Alternatively or additionally, motion vector accuracy may be assessed based on signal SNR—e.g., the SNR of signals that locate stylus 506.

In some examples, the accuracy of motion vector 518 may be at least a partial function of the motion characteristics of stylus 506. If, for example, stylus 506 frequently changes direction within the touch frames or frame portions across which motion vector 518 is determined, the motion vector may be considered as less accurate. Generally, sinusoidal, erratic, and/or random stylus motion may lead to a less accurate motion vector. In contrast, consistent stylus progression in the substantially same direction may lead to a more accurate motion vector.

FIG. 7 shows a flowchart illustrating an example method 700 for operating a display system having a capacitive touch sensor. Method 700 may be performed at display system 100, and/or in connection with touch sensor 200, touch sensor 300, and/or touch sensor 500, for example.

At 702, method 700 includes operating the touch sensor over a plurality of successively repeating touch frames. The touch frames may assume various suitable forms, such as those of touch frames 502, 600, 602, 604, 606, and/or 608, and may include one or more of a synchronization beacon, full search, and a local search. The touch frames may include driving a plurality of electrodes (e.g., transmit rows, sensels) and receiving at a plurality of electrodes (e.g., receive columns, sensels). For example, all of the plurality of electrodes may be driven during full searching, whereas a relatively lesser subset of electrodes may be driven during local searches (during stylus-interaction sub-frames). During full searches, the touch sensor may locate one or more input mechanisms. During local searches, the touch sensor may listen for stylus state information from an active stylus, such as stylus 400 and/or 506.

At 704, method 700 includes, with the touch sensor, in each of the touch frames, sensing touch input from a user's body. The touch input may include finger input in contact with the display system, multiple touch inputs, and/or hover input. Sensing the touch input may include sensing capacitive influence at one or more electrodes caused by the user's body.

At 706, method 700 includes, with the touch sensor, determining a motion vector for an active stylus in relation to the touch sensor. Determining the motion vector may include, at 708, identifying respective locations of the stylus in each of one or more touch frames, and/or, at 710, receiving output at one or more electrodes of the touch sensor. For example, two or more stylus locations may be determined in a single touch frame or across multiple touch frames. The motion vector may be determined using any suitable averaging, statistical, and/or other methods. Determining the motion vector may include, at 712, operating the touch sensor in a first mode to identify the selected portion of the touch sensor based on a location of the active stylus, and, based on the identifying of the selected portion, operating the touch sensor in a second mode to carry out the electrostatic interaction at that selected portion, and not at other portions of the touch sensor. The first mode may include full searching at the plurality of electrodes and may identify a portion (e.g., sensel band) corresponding to the location of the stylus. The second mode may include local searching at the identified portion (e.g., sensel band), and may include receiving stylus state information. The second mode may include receiving output at a subset of electrodes and/or multiplexing the selected portion to receive circuitry of the touch sensor.

At 714, method 700 includes estimating the location of the active stylus based on the motion vector. The motion vector may be determined in a first touch frame, and the stylus location may be estimated in a second touch frame subsequent to the first touch frame based on the motion vector. Stylus location estimation may include extrapolating the motion vector and/or any other suitable method of estimation.

At 716, method 700 includes, in each of the touch frames, for a stylus-interaction sub-frame of that touch frame allocated for performing electrostatic interaction between an active stylus and the touch sensor, selecting a portion of the touch sensor based on the motion vector. As indicated at 718, the selected portion may correspond to the estimated location of the stylus. At 720, selecting the portion may include operating the touch sensor in the second mode (e.g., local searching) during the stylus-interaction sub-frame. At 722, selecting the portion may include varying the size of the selected portion based on an accuracy of the motion vector. For example, for a greater accuracy of the motion vector the selected portion is identified as having a lesser size, and, for a lesser accuracy of the motion vector the selected portion is identified as having a greater size. The motion vector accuracy may be assessed based on motion characteristics of the stylus and/or signal SNR, for example.

At 724, method 700 includes, in each of the stylus-interaction sub-frames, operating the selected portion of the touch sensor differently than other portions of the touch sensor to carry out the electrostatic interaction. At 726, operating the selected portion differently may include multiplexing receive circuitry of the touch sensor to the selected portion and not to other portions. Operating the selected portion may include listening for transmissions of stylus state information.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
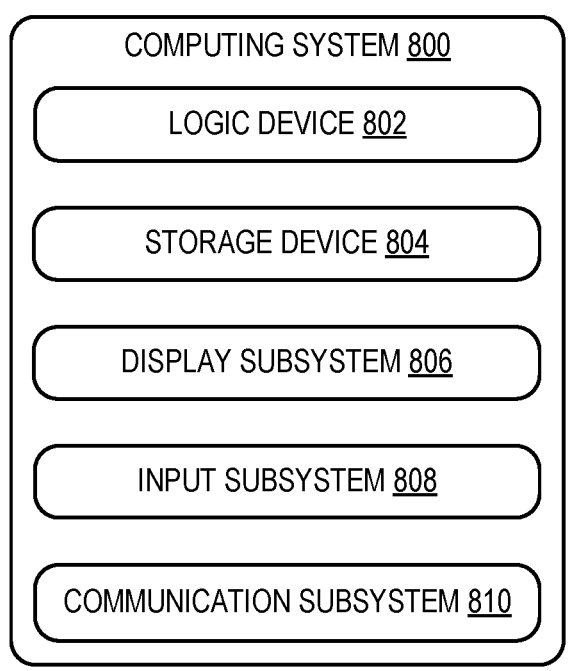
FIG. 8 shows a block diagram of an example computing device.

FIG. 8 schematically shows a non-limiting embodiment of a Computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of Computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple Computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow Computing system 800 to send and/or receive messages to and/or from other devices via a network such as the Internet.

Another example provides a method for operating a display system having a capacitive touch sensor comprising operating the touch sensor over a plurality of successively repeating touch frames, with the touch sensor, determining a motion vector for an active stylus in relation to the touch sensor, and in each of the touch frames, for a stylus-interaction sub-frame of that touch frame allocated for performing electrostatic interaction between an active stylus and the touch sensor, selecting a portion of the touch sensor based on the motion vector, where, in each of the stylus-interaction sub-frames, the selected portion of the touch sensor is operated differently than other portions of the touch sensor to carry out the electrostatic interaction. In such an example, determining the motion vector alternatively or additionally may include identifying a respective location of the active stylus in one or more touch frames, and where the motion vector is determined based on the identified respective locations. In such an example, identifying the respective locations of the active stylus alternatively or additionally may include, for each of the one or more touch frames, receiving output at one or more electrodes of the touch sensor. In such an example, the motion vector alternatively or additionally may be determined in a first touch frame, and the method may further comprise estimating a location of the active stylus in a second touch frame subsequent to the first touch frame based on the motion vector. In such an example, the selected portion of the touch sensor alternatively or additionally may correspond to the estimated location of the active stylus in the second touch frame. In such an example, differently operating the selected portion of the touch sensor alternatively or additionally may include multiplexing receive circuitry to the selected portion of the touch sensor and not to the other portions. In such an example, determining the motion vector alternatively or additionally may include operating the touch sensor in a first mode to identify the selected portion of the touch sensor based on a location of the active stylus, and based on the identifying of the selected portion, operating the touch sensor in a second mode to carry out the electrostatic interaction at that selected portion, and not at other portions of the touch sensor. In such an example, the touch sensor alternatively or additionally may be operated in the second mode during the stylus-interaction sub-frames of the one or more preceding touch frames. In such an example, selecting the portion of the touch sensor alternatively or additionally may include varying a size of such selected portion of the touch sensor based on an accuracy of the motion vector, such that, for a greater accuracy of the motion vector the selected portion is identified as having a lesser size, and, for a lesser accuracy of the motion vector the selected portion is identified as having a greater size. In such an example, during the stylus-interaction sub-frame, the touch sensor receives from the active stylus at the selected portion data regarding one or more of an identifier, battery level, firmware version, button state, and tip force.

Another example provides a display system comprising a capacitive touch sensor, a logic device, and a storage device holding instructions executable by the logic device to operate the touch sensor over a plurality of successively repeating touch frames, with the touch sensor, determine a motion vector for an active stylus in relation to the touch sensor, and in each of the touch frames, for a stylus-interaction sub-frame of that touch frame that is allocated for performing electrostatic interaction between an active stylus and the touch sensor, select a portion of the touch sensor based on the motion vector, where, in each of the stylus-interaction sub-frames, the selected portion of the touch sensor is operated differently than other portions of the touch sensor to carry out the electrostatic interaction. In such an example, the instructions executable to determine the motion vector alternatively or additionally may be executable to identify a respective location of the active stylus in each of two or more touch frames, and where the motion vector is determined based on the identified respective locations. In such an example, the instructions executable to identify the identified respective locations of the active stylus alternatively or additionally may be executable to, for each of the two or more touch frames, receive output at one or more electrodes of the touch sensor. In such an example, the motion vector alternatively or additionally may be determined in a first touch frame, and the instructions alternatively or additionally may be executable to estimate a location of the active stylus in a second touch frame subsequent to the first touch frame based on the motion vector. In such an example, the selected portion of the touch sensor alternatively or additionally may correspond to the estimated location of the active stylus in the second touch frame. In such an example, the instructions executable to differently operate the selected portion of the touch sensor alternatively or additionally may be executable to multiplex receive circuitry to the selected portion of the touch sensor and not to the other portions. In such an example, the instructions executable to determine the motion vector alternatively or additionally may be executable to, for any given one of the touch frames, in one or more preceding touch frames, operate the touch sensor in a first mode to identify the selected portion of the touch sensor that corresponds to a location of the active stylus, and based on the identifying of the selected portion, operate the touch sensor in a second mode to further locate the active stylus within the selected portion. In such an example, the instructions executable to operate the touch sensor in the second mode alternatively or additionally may be executable to operate the touch sensor in the second mode during the stylus-interaction sub-frames of the one or more preceding touch frames.

Another example provides a display system comprising a capacitive touch sensor, a logic device, and a storage device holding instructions executable by the logic device to operate the touch sensor over a plurality of successively repeating touch frames, with the touch sensor, determine a motion vector for an active stylus in any given one of the touch frames in relation to the touch sensor by, in one or more preceding touch frames, operate the touch sensor in a first mode to identify a selected portion of the touch sensor that corresponds to a location of the active stylus, and based on the identifying of the selected portion, operate the touch sensor in a second mode to further locate the active stylus within the selected portion, in the given one of the touch frames, for a stylus-interaction sub-frame of that touch frame allocated for performing electrostatic interaction between an active stylus and the touch sensor, select the selected portion of the touch sensor based on the motion vector, where, in each of the stylus-interaction sub-frames, the selected portion of the touch sensor is operated differently than other portions of the touch sensor to carry out the electrostatic interaction. In such an example, the instructions alternatively or additionally may be executable to estimate a location of the active stylus in a touch frame subsequent to the given one of the touch frames based on the motion vector It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a display system having a capacitive touch sensor, comprising:
   operating the touch sensor over a plurality of successively repeating touch frames;
   with the touch sensor, determining a motion vector for an active stylus in relation to the touch sensor; and
   in each of the touch frames, for a stylus-interaction sub-frame of that touch frame allocated for performing a first electrostatic interaction between the active stylus and the touch sensor, selecting a portion of the touch sensor based on the motion vector;
   where, in each of the stylus-interaction sub-frames, the selected portion of the touch sensor is operated differently than other portions of the touch sensor to carry out the first electrostatic interaction, the first electrostatic interaction including receiving state information, and not a locating signal, from the active stylus, and
   where a portion of each of the touch frames other than the stylus-interaction sub-frames is allocated for performing a second electrostatic interaction between the active stylus and the touch sensor, the second electrostatic interaction including receiving the locating signal, and not the state information, from the active stylus.

2. The method of claim 1, where determining the motion vector includes identifying a respective location of the active stylus in one or more touch frames, and where the motion vector is determined based on the identified respective locations.

3. The method of claim 2, where identifying the respective locations of the active stylus includes, for each of the one or more touch frames, receiving output at one or more electrodes of the touch sensor.

4. The method of claim 1, where the motion vector is determined in a first touch frame, the method further comprising estimating a location of the active stylus in a second touch frame subsequent to the first touch frame based on the motion vector.

5. The method of claim 4, where the selected portion of the touch sensor corresponds to the estimated location of the active stylus in the second touch frame.

6. The method of claim 1, where differently operating the selected portion of the touch sensor includes multiplexing receive circuitry to the selected portion of the touch sensor and not to the other portions.

7. The method of claim 1, where determining the motion vector includes:
   operating the touch sensor in a first mode to identify the selected portion of the touch sensor based on a location of the active stylus; and
   based on the identifying of the selected portion, operating the touch sensor in a second mode to carry out the first electrostatic interaction at that selected portion, and not at other portions of the touch sensor.

8. The method of claim 7, where the touch sensor is operated in the second mode during the stylus-interaction sub-frames of one or more preceding touch frames.

9. The method of claim 7, where selecting the portion of the touch sensor includes varying a size of such selected portion of the touch sensor based on an accuracy of the motion vector, such that, for a greater accuracy of the motion vector the selected portion is identified as having a lesser size, and, for a lesser accuracy of the motion vector the selected portion is identified as having a greater size.

10. The method of claim 1, where the state information includes data regarding one or more of an identifier, battery level, firmware version, button state, and tip force.

11. A display system, comprising:
   a capacitive touch sensor;
   a logic device; and
   a storage device holding instructions executable by the logic device to:
      operate the touch sensor over a plurality of successively repeating touch frames;
      with the touch sensor, determine a motion vector for an active stylus in relation to the touch sensor; and
      in each of the touch frames, for a stylus-interaction sub-frame of that touch frame that is allocated for performing a first electrostatic interaction between the active stylus and the touch sensor, select a portion of the touch sensor based on the motion vector;
      where, in each of the stylus-interaction sub-frames, the selected portion of the touch sensor is operated differently than other portions of the touch sensor to carry out the first electrostatic interaction, the first electrostatic interaction including receiving state information, and not a locating signal, from the active stylus, and where a portion of each of the touch frames other than the stylus-interaction sub-frames is allocated for performing a second electrostatic interaction between the active stylus and the touch sensor, the second electrostatic interaction including receiving the locating signal, and not the state information, from the active stylus.

12. The display system of claim 11, where the instructions executable to determine the motion vector are executable to identify a respective location of the active stylus in each of two or more touch frames, and where the motion vector is determined based on the identified respective locations.

13. The display system of claim 12, where the instructions executable to identify the identified respective locations of the active stylus are executable to, for each of the two or more touch frames, receive output at one or more electrodes of the touch sensor.

14. The display system of claim 11, where the motion vector is determined in a first touch frame, and where the instructions are further executable to estimate a location of the active stylus in a second touch frame subsequent to the first touch frame based on the motion vector.

15. The display system of claim 14, where the selected portion of the touch sensor corresponds to the estimated location of the active stylus in the second touch frame.

16. The display system of claim 11, where the instructions executable to differently operate the selected portion of the touch sensor are executable to multiplex receive circuitry to the selected portion of the touch sensor and not to the other portions.

17. The display system of claim 11, where the instructions executable to determine the motion vector are executable to, for any given one of the touch frames, in one or more preceding touch frames:

operate the touch sensor in a first mode to identify the selected portion of the touch sensor that corresponds to a location of the active stylus; and based on the identifying of the selected portion, operate the touch sensor in a second mode to further locate the active stylus within the selected portion.

18. The display system of claim 17, where the instructions executable to operate the touch sensor in the second mode are executable to operate the touch sensor in the second mode during the stylus-interaction sub-frames of the one or more preceding touch frames.

19. A display system, comprising:

a capacitive touch sensor;

a logic device; and a storage device holding instructions executable by the logic device to:

operate the touch sensor over a plurality of successively repeating touch frames;

with the touch sensor, determine a motion vector for an active stylus in any given one of the touch frames in relation to the touch sensor by, in one or more preceding touch frames:

operate the touch sensor in a first mode to identify a selected portion of the touch sensor that corresponds to a location of the active stylus based on a locating signal transmitted from the active stylus during the first mode; and based on the identifying of the selected portion, operate the touch sensor in a second mode to further locate the active stylus within the selected portion based on state information transmitted from the active stylus during the second mode;

in the given one of the touch frames, for a stylus-interaction sub-frame of that touch frame allocated for performing electrostatic interaction between an active stylus and the touch sensor, select the selected portion of the touch sensor based on the motion vector;

where, in each of the stylus-interaction sub-frames, the selected portion of the touch sensor is operated differently than other portions of the touch sensor to carry out the electrostatic interaction, where the active stylus transmits the locating signal, and not the state information, during the first mode, and where the active stylus transmits the state information, and not the locating signal, during the second mode.

20. The display system of claim 19, where the instructions are further executable to estimate a location of the active stylus in a touch frame subsequent to the given one of the touch frames based on the motion vector.

* * * * *